March 20, 1956

G. A. PATTERSON ET AL 2,739,252

IMMERSIBLE ELECTRIC MOTOR

Filed Feb. 11, 1953

*Inventors*
Glenn A. Patterson
Elmer M. Deters
By McCanna and Morsbach
*Attys.*

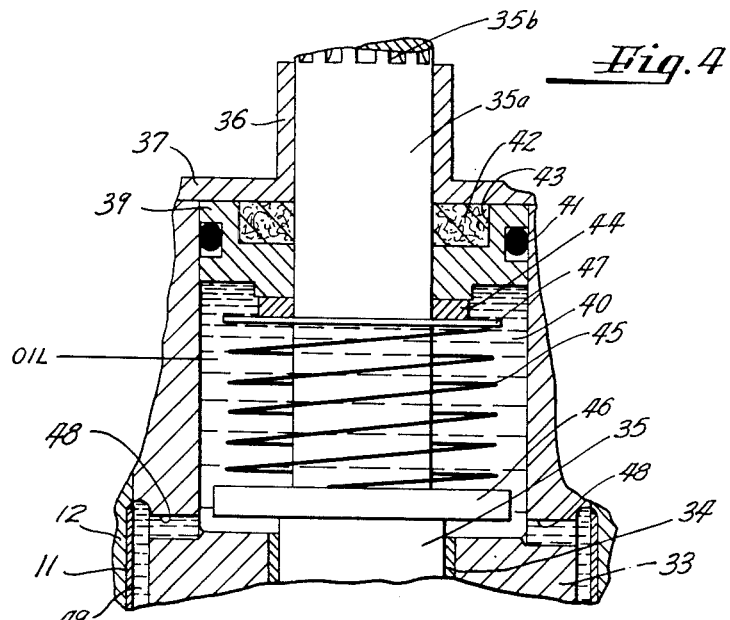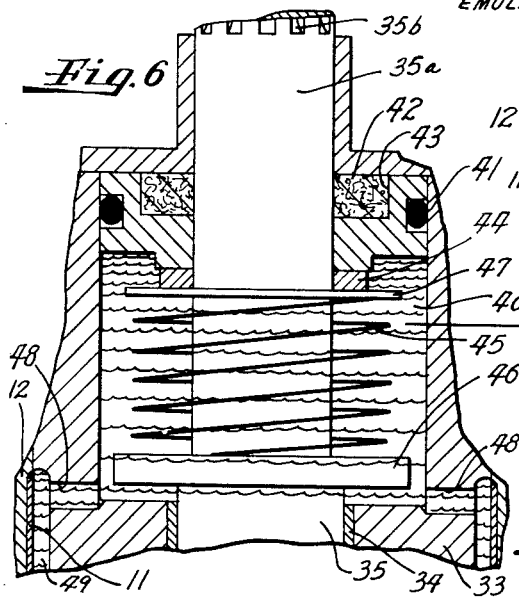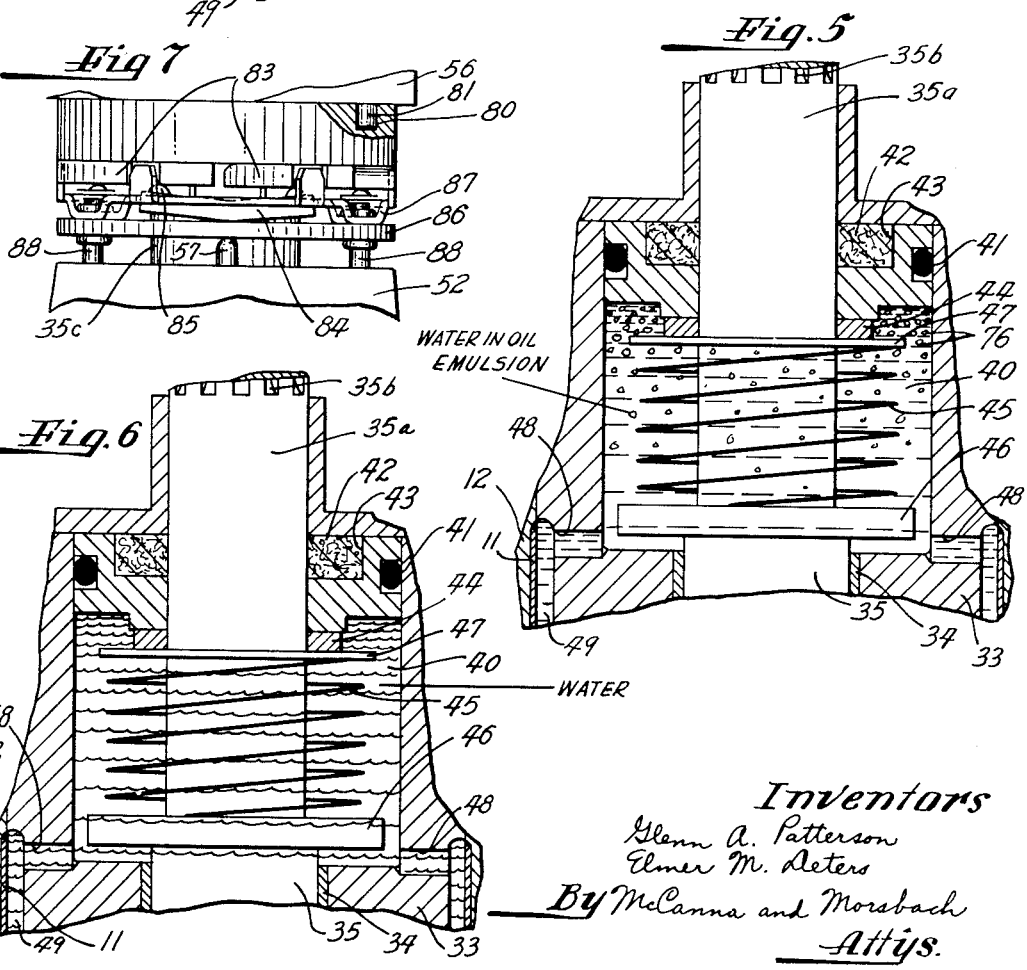

United States Patent Office 2,739,252
Patented Mar. 20, 1956

2,739,252

IMMERSIBLE ELECTRIC MOTOR

Glenn A. Patterson and Elmer M. Deters, Davenport, Iowa, assignors to Red Jacket Manufacturing Co., Davenport, Iowa, a corporation of Iowa Application February 11, 1953, Serial No. 336,266

6 Claims. (Cl. 310—87)

This invention relates to an immersible electric motor, and particularly to such a motor especially adapted for use with pumps for pumping water, brine, oil or other liquids.

It is an object of the present invention to provide a novel and improved electric motor adapted to operate in a liquid such as water or the like.

It is also an object of this invention to provide a novel immersible electric motor which initially operates with all of its parts sealed from the outside liquid, and after long-continued use resulting in leakage of the outside liquid into the motor is capable of operating with its rotor exposed to the outside liquid.

Another object of this invention is to provide an immersible electric motor of novel construction enabling the motor to have a longer operating life.

A further object of this invention is to provide an immersible electric motor of novel structure which is particularly adapted for use in conjunction with a water well pump.

Other objects and advantages of the pesent invention will be apparent from the following description of a preferred embodiment thereof, which is shown in the accompanying drawings to illustrate the construction and principles of operation of the present invention.

In the drawings:

Figures 4, 5 and 6 are longitudinal sectional views of the shaft bearing and seal at the upper end of the motor, showing different phases in the life of the motor; and Figure 7 is an enlarged longitudinal view with parts broken away, showing the thrust bearing associated with the rotor of the motor.

In the accompanying drawings, the motor of the present invention is shown in conjunction with a multi-stage centrifugal pump of a known type used primarily in deep well pumping operations, though it is also adapted for other uses requiring a motor capable of satisfactory operation over a long period of time while continually immersed in water.

Figure 2:
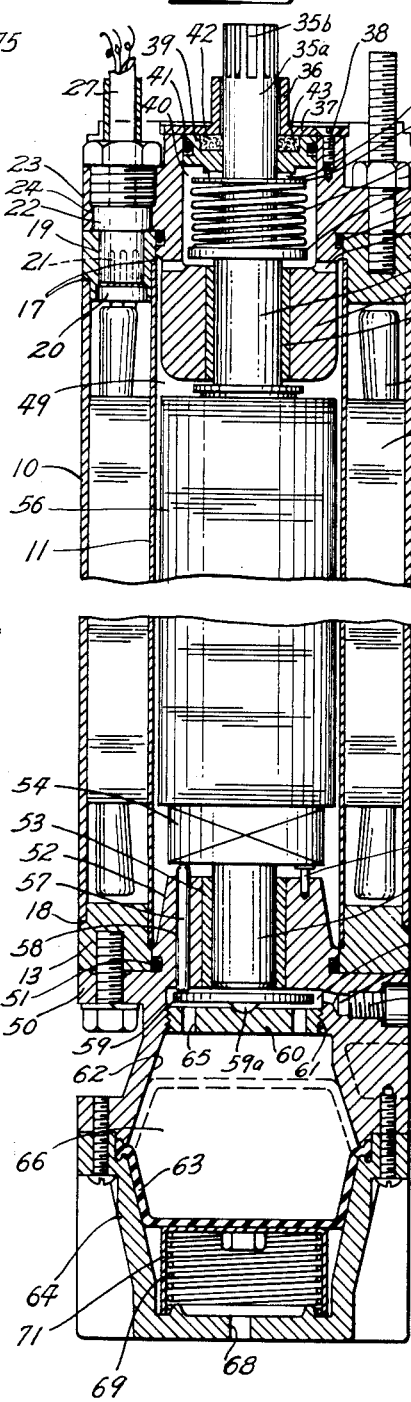
Figure 2 is a longitudinal section through the motor.

Referring to Fig. 2 showing the preferred embodiment, the electric motor of the present invention includes a sealed stator construction in which the field coil is sealed and isolated from the water in the well and from the contents of the rotor chamber. A suitable known construction has an outer cylindrical shell 10, preferably of stainless steel forming the rigid outer housing of the motor. A smaller cylindrical inner shell 11 preferably of substantially thinner section is disposed within the outer shell concentric therewith and is also preferably of stainless steel. The space between the inner and outer shells is closed at each end by an upper end ring 12 and a lower end ring 13. The assembly of the outer and inner shells 10, 11 and the end rings 12, 13 defines an annular stator chamber 14 within which are located the field windings 15, which run through slots in the stator laminations 16 in the usual manner. The outer and inner shells are welded at 17 and 18 to the upper and lower end rings respectively to seal the stator chamber. The stator chamber 14 is filled with a mass of homogenous, waterproof resin of the thermosetting type. This filling is done by a suitable vacuum filling process so as to completely eliminate air and moisture from the stator chamber. The plastic filler fills the spaces surrounding the field windings and the stator laminations, as well as the interstices between the windings and the laminations. Since the plastic filler is of the thermosetting type, after hardening it does not soften upon again being heated. Preferably this resinous filling material has a low coefficient of thermal expansion and has good heat conducting characteristics.

While any suitable electrical fitting may be employed for making electrical connection to the field coil 15 in the present embodiment, the upper end ring 12 is formed with a downwardly extending opening 19 at which is located a plug type connector 20 leading from the field winding 15 and carrying prong terminals 21. A complementary socket member 22 of rubber or the like snugly engages the prongs 21 to provide a sound electrical connection therewith. A top end cap 23 is mounted above the upper end ring 12 and is formed with an opening 24 aligned with the end ring opening 19 and receiving the flanged upper end of the socket 22. A hexagonal nut 25 carries an externally threaded neck 24 which is threadedly received at the opening in the top end plate. Conductors from the socket 22 are encased in a brass sheath 27 extending up through the nut 25 into the intake chamber 28 of the pump (Fig. 3) and thence through an opening 29 in the pump casing up to a suitable source of electric power outside the well.

The top end plate 23 is suitably bolted, by means of bolts 30 and clamping nuts 31, to the top of the upper end ring 12, with an O-ring 32 of rubber or the like located between the top end plate and the upper end ring to prevent leakage between these members. The top end plate is formed with an integral annular neck 33 which projects down into the upper end of the inner shell 11 and carries a steel backed babbitt faced journal bearing 34 for the shaft 35 of the motor. A tubular member 36 extending above the top of the top end plate 23 carries a flat transverse annular flange 37 at its lower end attached to the upper face of the top end plate 23, as by screws 38. A stationary annular metal (preferably steel) seat member 39 is snugly received in the upper end of the axial chamber 40 formed in the top end plate and is formed with an annular recess in its periphery at which is located a resilient O-ring 41 preventing leakage thereat. The seal member 39 at its upper face engages the lower face of the flange 37 and is formed thereat with a central annular recess 43 receiving a felt ring 42. A spring-actuated rotary annular seal member 44 comprising a plastic bound carbon disk is spring-pressed into engagement with the lower face of the stationary seal member 39 to provide a substantially liquid-tight seal thereat. A compression coil spring 45 at its lower end is seated against the enlarged flange 46 on the shaft 35 and at its upper end engages the annular plate 47 which is loosely mounted on the shaft and which, in turn, engages the lower face of the rotating seal member 44 to impart to the latter the force of spring 45. The reduced diameter portion 35a of the shaft 35 extends rotatably through the seal assembly of the rotary seal member 44, stationary seal member 39, felt ring 42, and tubular member 36 and at its upper end is splined at 35b for attachment to the drive shaft of the pump. At the lower end of its axial chamber 40 the top end plate 23 is formed with a plurality of transverse passages 48 leading to the periphery of the lower neck portion 33 of the top end plate and communicating thereat with the rotor chamber 49 within the inner shell 11. The chamber 40 is thus effectively separated from the chamber 49 but restricted communication is permitted through passages 48.

Figure 1:
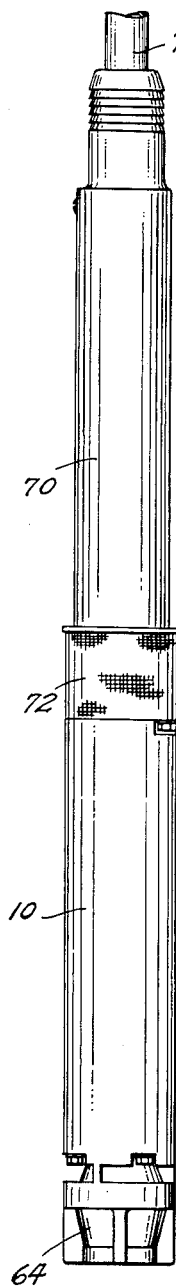
Figure 1 is a longitudinal view showing the motor of the present invention connected to a centrifugal water pump.

At the lower end of the casing assembly there is provided a bottom end plate 50 bolted to the underface of the lower end ring 13 and sealed at its attachment thereto by an O-ring 51, as best seen in Fig. 2. The bottom end plate is formed with an integral, upwardly projecting, annular neck 52 which carries a steel backed babbitt faced journal bearing 53 for the lower end 35c of the rotor shaft of the motor. The journal bearings 34 and 53 being babbitt faced are suitable for either oil or water lubrication for reasons presently to be discussed. A suitable thrust bearing, indicated generally at 54 in Fig. 1, is located above the journal 53. This thurst bearing in capable of operating in water, as well as in oil.

As best seen in Fig. 7, the thrust bearing 54 is of a known type which includes a plate 80 which rotates in unison with the rotor 56 through a connection thereto including a plurality of pins 81 carried by the rotor and snugly received in recesses 82 in plate 80. The plate 80 forms the rotary element of the thrust bearing and in this instance is of resin bonded carbon. Bearing against the under face of plate 80 are a plurality of stationary stainless steel plates 83. A plurality of rocker arms 84 are provided with rounded projections 85 which bear against the lower faces of the plates 83. The rocker arms are disposed between the plates 83 and the stationary thrust plate 86. A cage 87 is supported by the thrust plate 86 and serves to properly locate the stainless steel plates 83 and the rocker arms 84 in assembled relation, as shown in Fig. 7. A series of thrust rods 57 and a plurality of guide pins 88 carried by the neck 52 of the bottom end plate bear against the lower face of the plate 86.

From Fig. 2 it will be apparent that the thrust rods 57 extend through vertical passages 58 in the upwardly extending neck 52 of the bottom end plate 50. A plate 59 which supports the lower ends of the rods 57 is provided with a centrally located semi-spherical projection 59a at its under side disposed in a complementary recess in the top face of the adjusting nut 60. The adjusting nut 60 is threadedly received at the threaded opening 61 in the bottom end plate 50 and is threadedly adjustable thereat. It will be noted that this mounting of the plate 59 enables it to tilt to apply uniform thrust on the plate 86.

From Fig. 2 it will be apparent that the armature 56 is disposed within the rotor chamber 49 formed by the inner shell 11 and the top and bottom end plates 23 and 50. This space, as well as the chamber 40 at the top end plate 23, is filled with lubricating oil through an opening 89 subsequently closed by a plug 90, by a suitable vacuum filling process, great care being exercised at this time to eliminate air pockets and to insure that this space is completely filled with oil. While there is no necessity that this oil be of high dielectric properties, as in conventional dry motors of the immersible type, it is of a type capable of emulsifying in water. The oil should also have low viscosity and a minimum change in viscosity with temperature, high thermal conductivity, and rust inhibiting properties.

At its lower end the bottom end plate 50 is formed with an axial, generally frusto-conical chamber 62 located below the adjusting nut 60. A flexible diaphragm 63 is clamped at its beaded periphery between the lower end of bottom end plate 50 and a cap 64. The adjusting nut 60 is formed with a plurality of passages 65 which effect communication between the chamber 66 above diaphragm 63 and the chamber 67 above the adjusting nut, which latter chamber is in communication through the bearing bushing 53 and passages 58 with the rotor chamber 49. The cap 64 is formed with an opening 68 for exposing the underside of the diaphragm to the pressure of the water in the well. A compression coil spring 69 acts between the bottom wall of cap 64 and a cup-shaped plate 70 attached to the underside of diaphragm 63 to exert a predetermined bias on the underside of the diaphragm. The chamber 66 above the diaphragm is, of course, filled with the same oil which is in the rotor chamber 49 and under the same pressure. The spring 69 initially maintains the oil pressure in the rotor chamber 49 at about 2 to 4 pounds per square inch in excess of the water pressure in the well, so that the leakage around the seal at the top of the rotor chamber tends to be outward from the rotor chamber rather than from the outside into the rotor chamber.

Figure 3:
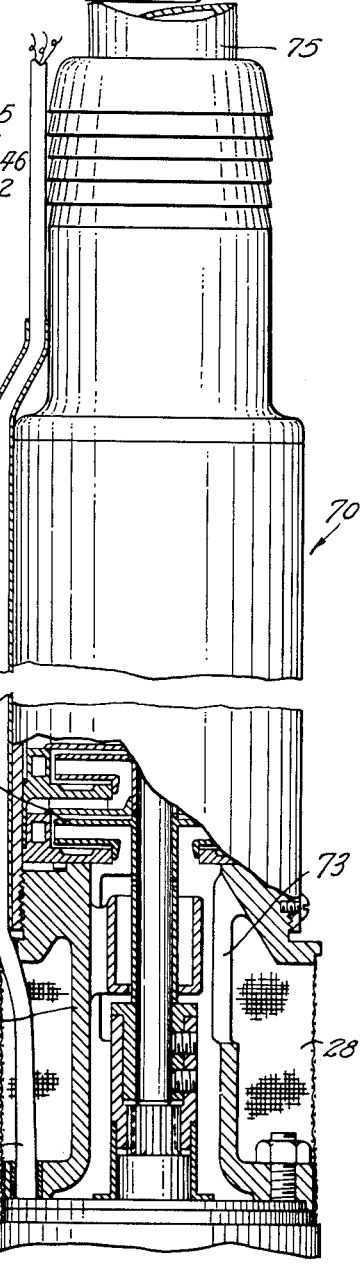
Figure 3 is a longitudinal view, partly in section, of the pump of Fig. 1 driven by the motor of Fig. 2.

The above-described motor is suitably bolted to the lower end of the casing of a centifugal pump, indicated generally at 70 in Figs. 1 and 3. The pump is of conventional design and includes a plurality of rotary centrifugal impellers 71 driven from the motor shaft 35 for pumping the water in a multiple-stage operation. At its lower end the pump casing carries a screen 72 through which water passes into the annular inlet chamber 28 and thence through the opening 73 in the annular casing wall 74 into the eye of the first impeller.

In service the pump assembly comprising the pump of Fig. 3 secured to the top of the motor of Fig. 2 as shown in Fig. 1 is immersed in the water of the well at a suitable depth for pumping operations, the water being delivered from the pump through drop pipe 75. Since the stator is sealed within the space between the shells 10 and 11 well water is excluded from contact with any part of the motor which might short the electrical circuit and thus cause failure of the motor. Furthermore, the space between these shells is completely filled with a thermosetting solid to exclude air and moisture thereby reducing to a minimum the coefficient of thermal expansion of this assembly and facilitating the dissipation of heat through the walls into the surrounding water.

The oil filled chambers of the motor comprising the rotor chamber 49 and the chamber 62 have no communication with the exterior except through chamber 40 which in turn has only a minimum of communication through the seal around the shaft sufficient to provide lubrication.

The motor is so constructed that the situation within the motor chambers progressively changes through three principal phases as illustrated in Figs. 4, 5 and 6 whereby the trouble-free service life of the motor is increased substantially over that of prior motors designed to run in water.

The first phase of operation is illustrated in Fig. 4 and in full lines in Fig. 2. It will be seen that when the motor is initially installed in a well (in the case of the illustrated embodiment of the invention) the chambers 40, 49 and 66 and all connecting passages are completely filled with oil under a pressure sufficient to compress the spring 69 (preferably 2 to 4 pounds). The diaphragm then occupies the full line position of Fig. 2 and the chamber 40 is filled with oil as indicated by the sectioning in Fig. 4. As the motor continues to operate under service conditions a small amount of oil creeps out of chamber 40 along the faces of the seal only sufficient to maintain a film of oil at the bearing. Simultaneously the diaphragm 63 moves up to maintain the pressure on the oil. Obviously no water can enter chamber 40 along the shaft even upon heating and cooling of the motor parts due to the higher pressure on the oil within the chambers, which higher pressure is maintained at all depths of immersion since the lower or outer side of the diaphragm is subjected to the exterior pressure through opening 68 and to the additional pressure of the spring 69.

This situation prevails until the diaphragm 63 reaches the dotted line position of Fig. 2 which represents the limit of its travel, the oil displaced in the course of this movement providing an oil film over the seal and thus lubricating the seal over a period of a good many years of normal service. This period represents the maximum service free life of the usual so called "dry" motor because, at this point water begins to work in along the shaft so that the motor is thereafter soon shorted or the bearings damaged, necessitating replacement or repair.

The second phase of operation of the motor is illustrated in Fig. 5 and the dotted line showing of Fig. 2 wherein the diaphragm has reached the end of its travel and the pressure within the chambers has dropped to that of the surrounding water. Under these circumstances when the motor runs the heat of the motor causes expansion of the oil and when the motor stops and the oil cools, a few drops of the surrounding water is drawn in around the seal and into chamber 40. However, since the oil is of the emulsifiable type this water becomes emulsified in the oil and is retained in the chamber 40 as illustrated in Fig. 5 wherein the numeral 76 indicates the water droplets, the emulsion still being substantially completely all oil. As the proportion of water in the chamber 40 increases it is progressively emulsified to maintain the chambers filled with oil emulsion in which the oil is the continuous phase. This action proceeds over a period of years until ultimately all of the oil has been dissipated from the motor and the chamber 40 is filled with water as illustrated in Fig. 6 wherein the sectioning in the chamber 40 indicates water.

Fig. 6 illustrates the third phase in the operation of the motor wherein the journal bearings 34 and 53, the thrust bearing 54 and the seal are water lubricated. It will be observed however that the structure is such as to prevent circulation of water through the motor and to hold to a minimum the ingress and egress of water, thereby substantially preventing chemical action of the water on internal parts of the motor and the possibility of mineral deposits therefrom forming on the internal parts.

Numerous advantages accrue for the novel construction described, the most important of which is a long trouble-free service life wherein the motor is oil lubricated during the major portion of its life and upon the extrusion of the oil reverts to water lubrication. The construction is such that the presence of water in the rotor chamber does not interfere with its operation and high dielectric oils need not be used. Because the stator is hermetically sealed from the surroundings heavy insulation is avoided and the motor can be of minimum diameter, and since the water at no time circulates through the rotor chamber there is no substantial deposit of minerals on the working parts of the motor or damaging action from chemical action by the water.

While in the foregoing description and in the accompanying drawings there is disclosed a specific preferred embodiment of the present invention, it is to be understood that various modifications, omissions and refinements departing from the illustrated form of the invention may be adopted without departing from the spirit and scope of the present invention.

We claim:

1. An electric motor for operation immersed in water comprising a stator body having a motor field winding defining a rotor chamber, and means for sealing the stator body against the access of liquid to the field winding, a rotor in said chamber, an output shaft supporting the rotor and extending out through one end of the chamber, a first closure means for closing said one end of said rotor chamber including a rotary shaft seal for limiting the flow of liquid along the interface between said output shaft and said closure means substantially to that required for lubricating the shaft seal, a second closure means for sealing the other end of said stator body against the passage of liquid to or from the chamber defined by the stator body and said first and second closure means, oil and water lubricatible bearings rotatably supporting said shaft and disposed between said first closure means and said rotor and between said second closure means and said rotor, emulsifiable lubricating oil filling said rotor chamber and surrounding said rotor bearings for lubricating the latter, an oil reservoir between said second closure means and said rotor chamber communicating with the rotor chamber, said second closure means including a movable wall exposed at one side to the water pressure outside said motor and on the other side to the oil in said reservoir, means acting to move said movable wall and thereby maintain the oil in the reservoir and rotor chamber at a pressure in excess of the water pressure around the motor to supply lubricating oil to the shaft seal during a first phase of the motor life, stop means engageable by said movable wall to limit movement thereof after a predetermined quantity of oil has been displaced through the shaft seal to cause the fluid pressure in the chamber to fall to that of the liquid surrounding the motor, said oil having emulsifying properties to form an emulsion with the water as it enters the chamber past the shaft seal to replace oil displaced past the seal to provide an oil and water emulsion lubricant of decreasing oil content for said bearings and said shaft seal, said shaft seal acting to limit circulation of water through the rotor chamber for water lubrication of the bearings after complete exhaustion of oil therefrom during a last phase of motor life.

2. An immersible electric motor adapted to be submerged in water comprising inner and outer cylinders disposed in interfitting concentric relation and defining a cylindrical rotor chamber and an annular stator chamber between the inner and outer cylinders, a stator in the stator chamber, an output shaft connected to the rotor and extending out through one end of the inner cylinder, a first closure means for sealing said one end of said rotor chamber from the water outside said motor and including a rotary shaft seal for sealing the interface between said output shaft and said closure means, a second closure means for sealing the other end of said stator body against the passage to or from the chamber defined by the stator body and said first and second closure means, rotor bearings of the type adapted to be lubricated by oil and by water rotatably supporting said rotor in said rotor chamber and disposed between said first closure means and said rotor and between said second closure means and said rotor, emulsifiable oil filling said rotor chamber and surrounding said rotor bearings for lubricating the latter, an oil reservoir between said second closure means and said rotor chamber, said second closure means including a movable wall exposed at one side to the water pressure outside said motor and on the other side to the oil in said reservoir, spring means acting against said movable wall for maintaining the oil in the rotor chamber at a pressure in excess of the water pressure around the motor and for expelling oil from the reservoir into the rotor chamber to maintain the pressure therein as the oil leaks from the rotor chamber, stop means engageable with said movable wall to limit movement thereof after a predetermined quantity of oil has been displaced from the reservoir, means sealing the ends of the stator chamber from the liquid in the rotor chamber and the water outside the motor whereby the water leaking into the rotor chamber after said movable wall engages said stop means does not contact the stator, said oil including an emulsifying agent to form an emulsion with the water that leaks into the rotor chamber to provide an oil emulsion lubricant for said bearings and, after all of the oil in said rotor chamber has been replaced by the water that leaks thereinto, said bearings being adapted to be lubricated by the water whereby the motor thereafter operates as a water lubricated motor.

3. An electric motor for operation immersed in water comprising a stator body having a motor field winding therein sealed against access of liquid to the winding, said body defining a cylindrical rotor chamber, a motor armature in the rotor chamber, an output shaft connected to the armature and extending out of said rotor chamber through one end thereof, means defining an axial chamber at said one end of said rotor chamber including an end closure wall having an opening therein through which said output shaft extends, a rotary shaft seal between said output shaft and said closure wall for limiting the flow of liquid along the interface therebetween substantially to that required for lubricating the shaft seal, means defining an oil reservoir on the other end of said rotor chamber in communication with the latter, a diaphragm closing the end of said reservoir remote from said rotor chamber and sealing said reservoir and said rotor chamber from communication with the water outside said motor, oil and water lubricatible bearings at each end of said armature between said closure means and said diaphragm rotatably supporting the armature on the stator body, a volume of emulsifiable lubricating oil filling said reservoir, said rotor chamber and said axial chamber and surrounding said bearings for lubricating the latter, means for applying pressure on said diaphragm to maintain said oil under pressure in excess of the water pressure outside the motor to supply lubricating oil to the shaft seal during a first phase of the motor life, stop means engageable by said diaphragm to limit movement thereof after a predetermined quantity of oil has been displaced through the shaft seal to thereby cause the fluid pressure in the chambers to fall to that of the liquid surrounding the motor, closure means between said closure wall and said rotor chamber substantially closing said one end of said rotor chamber to separate said axial chamber from said rotor chamber whereby the water as it enters the axial chamber in replacing oil displaced past said rotary seal is emulsified in the oil in said axial chamber, said closure means having restricted passages extending therethrough providing restricted liquid flow between the axial chamber and the rotor chamber and adapted to permit the oil emulsion in the axial chamber to flow into the rotor chamber to thereby provide an oil and water emulsion lubricant of decreasing oil content for the bearings and shaft seal during an intermediate phase of the motor operating life, said shaft seal acting to limit circulation of water through the motor chamber for water lubrication of the bearings after complete exhaustion of oil therefrom during a last phase of the motor operating life.

4. An electric motor for operation immersed in water comprising a stator body having a motor field winding therein and defining a rotor chamber, means for sealing the stator body against the access of liquid to the field winding, a motor armature in the rotor chamber, an output shaft connected to the armature and extending outwardly of said rotor chamber through one end thereof, means defining an axial chamber on said one end of said rotor chamber and including an end closure wall having an opening thereon through which said output shaft extends, a rotary shaft seal between said output shaft and said closure wall for limiting the flow of liquid along the interface therebetween substantially to that required for lubricating the shaft seal, means defining an oil reservoir on the other end of said rotor chamber in communication with the latter, a diaphragm closing the end of said reservoir remote from said rotor chamber for sealing said reservoir and said rotor chamber from communication with the water outside said motor, a volume of emulsifiable oil filling said reservoir, said rotor chamber and said axial chamber, means for applying pressure on said diaphragm to move the latter and maintain said oil in the rotor and axial chambers under pressure in excess of the water pressure outside the motor to supply lubricating oil to the shaft seal during the first phase of the motor operating life, stop means engageable with said diaphragm to limit movement thereof after a predetermined quantity of oil has been displaced through the shaft seal to thereby cause the fluid pressure in the chambers to fall to that of the liquid surrounding the motor, closure means between said closure wall and said rotor chamber substantially closing said one end of said rotor chamber to separate said axial chamber from said rotor chamber whereby the water as it enters the axial chamber in replacing the oil displaced past said rotary seal is emulsified in the oil in said axial chamber, an oil and water lubricatible bearing carried by said end closure means and disposed between said closure means and said armature for rotatably supporting one end of the latter, a bearing disposed between said armature and said reservoir for rotatably supporting the other end of the latter, said closure means having restricted passages extending therethrough providing restricted liquid flow from the axial chamber to said rotor chamber and adapted to permit the emulsion in the axial chamber to flow into the rotor chamber to thereby provide an oil and water emulsion lubricant of decreasing oil content to said bearings and shaft seal for an intermediate phase of the motor operating life, said shaft seal acting to limit circulation of water through the rotor chamber for water lubrication of the bearings after complete exhaustion of oil therefrom during a last phase of the motor operating life.

5. An electric motor for operation immersed in water comprising a stator body having a motor field winding therein sealed against access of liquid to the winding and a rotor chamber, a motor armature in said rotor chamber, said motor being arranged for vertical operation and having a shaft connected to the armature and extending out of the upper end of the rotor chamber, means defining an axial chamber on the upper end of said rotor chamber and including a closure wall having an opening therein through which the shaft extends, a rotary seal between the shaft and the closure wall for limiting the flow of liquid along the interface therebetween substantially to that required for lubricating the shaft seal, means defining an oil reservoir on the lower end of the rotor chamber in communication with the latter, a diaphragm closing the lower end of the reservoir and sealing the latter from the water outside the motor, a volume of emulsifiable lubricating oil filling the reservoir, the rotor chamber and the axial chamber and surrounding said bearings for lubricating the latter, means for applying pressure to the diaphragm to maintain the oil in the axial chamber under pressure in excess of the water pressure outside the motor and to supply lubricating oil to the shaft seal during an initial phase of the motor operating life, stop means engageable with said diaphragm to limit movement thereof after a predetermined quantity of oil has been displaced through the shaft seal to thereby cause the fluid pressure in the chambers to fall to that of the liquid surrounding the motor, closure means between said closure wall and said rotor chamber substantially closing the upper end of said rotor chamber to separate the axial chamber from the rotor chamber whereby the water as it enters the axial chamber in replacing the oil displaced past said shaft seal is emulsified in the oil in said axial chamber, an oil and water lubricatible bearing connected to said closure means and disposed between said closure means and said rotor chamber, an oil and water lubricatible thrust bearing rotatably supporting the lower end of the armature on the stator body, said closure means having restricted passages extending therethrough for providing restricted liquid flow between said axial chamber and said rotor chamber whereby the oil emulsion formed in the axial chamber may flow downwardly into the rotor chamber to thereby provide an oil and water emulsion lubricant of decreasing oil content for said bearings and shaft seal for an intermediate phase of the motor operating life after said diaphragm means has reached its limit of movement, said shaft seal acting to limit circulation of water through the rotor chamber for water lubrication of the bearings after complete exhaustion of the oil therefrom during a last phase of the motor operating life.

6. An electric motor for operation immersed in water comprising a stator body having a motor field winding and defining a rotor chamber therein and means for permanently sealing the stator body against the access of liquid to the field winding, a rotor in the rotor chamber having an output shaft extending out of the rotor chamber, a first seal means adjacent one end of said rotor chamber including a rotary shaft seal for limiting the flow of liquid along the interface between the output shaft and the seal means substantially to that required for lubricating the shaft seal, a second seal means including a movable wall at the other end of said rotor chamber defining an oil reservoir at said other end of the rotor chamber, said second seal means sealing the other end of said stator body against the passage of fluid into or out of the chamber defined in the stator body between the first and second seal means, bearings of the type adapted to be lubricated by oil or by water rotatably supporting the rotor in the stator body and disposed adjacent opposite ends of the rotor between said first and second seal means, a lubricating oil filling said chamber in the stator body between said first and second seal means and surrounding the rotor and rotor bearings, means for applying pressure to said movable wall greater than the pressure of the water surrounding the motor to provide sufficient oil seepage through the shaft seal to oil lubricate the seal and bearings during a first phase of the motor service life, and means for terminating the application of pressure on the movable wall upon exhaustion of the oil from the reservoir for admission of lubricating water to the rotor chamber through the seal and admixture thereof with the oil in the rotor chamber to provide composite lubrication of the bearings during a second phase of the motor service life, said shaft seal acting to limit circulation of water through the rotor chamber for water lubrication of the bearings after complete exhaustion of oil from the chamber, during a last phase of motor service life.

References Cited in the file of this patent

UNITED STATES PATENTS

| | | |
|---|---|---|
| 2,258,064 | Myers | Oct. 7, 1941 |
| 2,301,340 | Spengler | Nov. 10, 1942 |
| 2,359,215 | Gold | Sept. 26, 1944 |
| 2,446,521 | Blom | Aug. 10, 1948 |
| 2,492,141 | Gaylord | Dec. 27, 1949 |
| 2,600,277 | Smith | June 10, 1952 |
| 2,682,229 | Luenberger | June 29, 1954 |